(12) United States Patent
Sapiro

(10) Patent No.: US 7,210,634 B2
(45) Date of Patent: May 1, 2007

(54) CIRCUIT FOR GENERATING AN IDENTIFICATION CODE FOR AN IC

(75) Inventor: Stephen Sapiro, Cornelius, OR (US)

(73) Assignee: Icid, LLC, Palo Alto, CA (US)

( * ) Notice: Subject to any disclaimer, the term of this patent is extended or adjusted under 35 U.S.C. 154(b) by 583 days.

(21) Appl. No.: 10/778,688

(22) Filed: Feb. 12, 2004

(65) Prior Publication Data

US 2005/0183047 A1   Aug. 18, 2005

(51) Int. Cl.
*G06K 19/06* (2006.01)
(52) U.S. Cl. ............ 235/492; 235/375; 235/384; 700/115; 716/4
(58) Field of Classification Search ............ 235/385; 702/73, 173
See application file for complete search history.

(56) References Cited

U.S. PATENT DOCUMENTS 5,367,148 A   11/1994   Storch et al.
6,161,213 A   12/2000   Lofstrom
6,212,638 B1   4/2001   Lee et al.
6,802,447 B2 *   10/2004   Horng ............... 235/375
2003/0151539 A1   8/2003   Wuidart et al.
2003/0151942 A1   8/2003   Bardouillet et al.

* cited by examiner

*Primary Examiner*—Seung Ho Lee
(74) *Attorney, Agent, or Firm*—Daniel J. Bedell; Smith-Hill and Bedell

(57) ABSTRACT

A ID circuit produces a unique binary identification code (ID) for each integrated circuit in which it is implemented by setting states of each bit of the ID as a function of random variations in material forming the IC that occur at the time the IC is fabricated. The ID circuit includes an ID generating circuit for generating the ID, a non-volatile memory, and a control circuit for writing the ID generated by the ID generating circuit into the non-volatile memory in response to a first occurrence of a write cue event. Thereafter the control circuit responds to each occurrence of a read cue event by reading the ID out of the non-volatile memory and providing it as an IC output.

20 Claims, 4 Drawing Sheets

CIRCUIT FOR GENERATING AN IDENTIFICATION CODE FOR AN IC

BACKGROUND OF THE INVENTION

1. Field of the Invention

The present invention relates in general to circuits for generating an identification code, and in particular, to a circuit that generates an identification code that is unique to each integrated circuit in which it is embedded.

2. Description of Related Art

Identification codes (IDs) have many purposes. For example an ID may be provided in printed form (e.g., user-names or bank account numbers), in graphical form (e.g., a picture on a driver license or a barcode on a product), in the form of a magnetic field (e.g., as provided by a magnetic strip on a credit card), as an electronic code conveyed by a signal. An ID can indicate the type of object bearing the ID. For example, a barcode-encoded UPC on a cereal box in a grocery store enables a grocer to determine the price of the goods when all boxes of the same kind of cereal are printed with the same barcode. An ID can distinguish a particular object from a population of similar objects. For example a user-name may distinguish one user of a computer network service from all other users of the service, or a bank account number may uniquely distinguish a customer account from all other bank accounts. An ID can confirm that the bearer of an ID is a genuine member of a population. For example, a photograph on a driver's license is a form of ID used to confirm that the bearer of the driver's license is the individual named on the driver's license.

Signals conveying binary strings are often used as IDs. For example, each instance of a particular type of integrated circuit (IC) chip can be made to generate an output signal conveying a unique binary coded ID. The ID generated by each IC may be used to distinguish that IC from among all other ICs, to verify that the particular IC is a legitimate copy of an IC and not an illegitimate counterfeit. The ID generated by an IC can also be used to identify any larger electronic system in which it is incorporated. "Radio Frequency Identification" tags (RFIDs) are ICs that produce radio frequency signals conveying binary IDs. When the RFIDs are attached to objects, such as for example merchandise in a retail store, packages for delivery, the unique radio frequency ID codes they generate can serve the same identification purposes as barcodes.

There are economic and other incentives for people to misuse IDs. For example, when an ID identifies goods as having been produced by a particular source, a source of counterfeit goods would want to provide the counterfeit goods with IDs that incorrectly identify them as having been produced by that particular source. Thus counterfeiters not only try to counterfeit goods, they also seek to counterfeit IDs that are associated with those goods. Accordingly, efforts have been made to render IDs difficult to copy or counterfeit. For example sophisticated procedures/algorithms and manufacturing processes are sometimes used to make IDs that are difficult for a counterfeiter to copy. A hologram is one example of a difficult to reproduce ID. Sometimes IDs are hidden or encoded in a way that makes it difficult for a would-be counterfeiter to discover them.

One way to foil an ID counterfeiter is to make it hard for the counterfeiter to determine which part of a code is actually used as an ID. U.S. Pat. No. 5,367,148, issued Nov. 22, 1994 to Storch et al., entitled COUNTERFEIT DETECTION USING ID NUMBERS WITH AT LEAST ONE RANDOM PORTION, teaches adding one or more "random" portions (each consisting of one or more digits) to an otherwise straightforward numerical ID, and of purposely using different presentations in the "external" appearance (e.g. as printed on the outside package box) of the ID and the "inner" appearance (e.g. inside the box on a customer return registration card), for detecting counterfeits. U.S. Pat. No. 6,212,638, issued Apr. 3, 2001 to Lee et al., entitled METHOD FOR GENERATING UNPREDICTABLE AUTHENTICATION IDENTIFICATION SYMBOLS, teaches use of special mathematical functions to generate sequences of unpredictable ID symbols, and to employ an unpredictable subset of the symbols from such a sequence for an actual ID.

The IDs described above are "static" in that, once a particular copy of an ID is generated, it stays the same each time the ID is presented. For example a barcode ID, once printed, never changes its appearance. A product serial number, once imprinted on the casing of a product or printed on a customer registration card, never changes its value. A user-name for logging into an on-line service remains the same once assigned.

U.S. Pat. No. 6,161,213, issued Dec. 12, 2000 to Keith Lofstrom, entitled SYSTEM FOR PROVIDING AN INTEGRATED CIRCUIT WITH A UNIQUE IDENTIFICATION, describes a circuit (currently marketed under the trademark "ICID") that may be incorporated into an IC chip for generating a unique ID for each IC in which it is embedded without requiring each IC to be separately processed. The ICID circuit includes an array of identification (ID) cells, and each ID cell controls the state of a separate bit of the ID to be generated based on relative doping levels within channels of transistors forming a part of the ID cell. Since the doping level randomly varies from transistor-to-transistor within an IC as a result of random process variations, the bit sequence of the ID produced by each copy of the ICID circuit is randomly established as the IC is fabricated. When the ID has a sufficiently large number of bits, the ID generated by each copy of the ICID circuit is highly likely to be unique even though a very large number of copies of the ICID circuit are manufactured.

The doping levels of the transistors of one or more of the ID cells of any given copy of an ICID circuit may be so similar that environmental variables such as ambient temperature and supply voltages can influence the ID bit state controlled by those ID cells. Thus, one characteristic of binary IDs produced by the ICID circuit is that a very small percentage of the bits of the ID it generates may not always be of the same state each time the ICID circuit generates the ID; the state of one or more bits of an ID may "drift" in that it changes from instance-to-instance of the generated ID. Thus, the ID that the ICID circuit produces is "dynamic" in that it does not always have exactly the same value each time it is generated. However, Lofstrom teaches that even though a few bits of each individual ID may drift, the ID can still be used to uniquely identify each IC from among a large population of ICIDs producing such IDs if the ID has a sufficiently large number of bits. Lofstrom teaches that two sufficiently long IDs may be considered with a high degree of confidence to have been produced by the same copy of an ICID circuit even though a few of their corresponding bits are not of matching states.

U.S. Patent Publication 2003/0151539 filed Aug. 14, 2003 by Wuidart et al and U.S. Patent Publication 2003/0151942 filed Aug. 14, 2003 by Bardouillet et al also describe a circuit that may be incorporated into an IC for generating an ID. The circuit includes a set of ID cells, each of which produces an output bit of a state that is a function of random parametric variations in the magnitudes of a pair of polysilicon resistors within each ID cell. The resistors are incorporated into a circuit outputting a 1 or a 0 bit depending on which resistor has lowest resistance when power is initially applied to the circuit. The bits produced by all of the ID cells form the output ID. In some cases, the resistance of the two resistors of a ID cell may be so similar that the ID cell's output bit may not always be of the same state every time power is applied to the ID cell. To stabilize the ID, the system temporarily increases the amount of current passing through the ID cell having the lowest resistance when the circuit is first energized, and the increased current permanently lowers the resistance of that resistor so that it will always be lower than that of the other resistor. Thereafter the ID cell will always produce the same output bit. This ID circuit produces an ID in which none of the bits vary in state, but can require a separate pin on the IC to supply high voltage power to the ID circuit to temporarily increase the supply voltage to the ID circuit to permanently reduce the resistance of the lowest resistance resistor in each ID cell.

SUMMARY OF THE INVENTION

A circuit in accordance with the invention produces a unique binary identification code (ID) for each integrated circuit in which it is embedded by setting states of each bit of the ID as a function of random variations in material forming the IC occurring at the time the IC was fabricated. The ID circuit includes an ID generating circuit for generating the ID, a non-volatile memory, and a control circuit for writing the ID generated by the ID generating circuit into the non-volatile memory in response to an occurrence of a write cue event. Thereafter the control circuit responds to each occurrence of a read cue event by reading the ID out of the non-volatile memory and providing it as an IC output.

The read cue event may be, for example, application of a read code as input to the IC. The write cue event may be, for example, application of power to the control circuit, a first occurrence of a read cue event, or application of a write code as input to the IC.

The state of one or more bits of the ID generated by the ID generating circuit may also be a function of IC temperature or other environmental factors, and the ID may therefore not always have exactly the same value if the ID generating circuit were to generate it more than once. But by storing only one occurrence of the ID output of the ID generating circuit in the non-volatile memory, and thereafter obtaining the ID it produces as an IC output from the memory, rather than from the ID generating circuit, whenever it responds to a read cue event, the control circuit insures that the IC's output ID always has the same value.

In one embodiment of the invention, the control circuit also stores a flag code in the non-volatile memory at the same time it stores the ID in the non-volatile memory. Thereafter, on each subsequent occurrence of the write cue event, the control circuit first determines whether the flag code resides in the non-volatile memory and if so, refrains from again writing the ID output of the ID generating circuit into the non-volatile memory.

In an alternative embodiment of the invention, the control circuit blows an internal fusible link to set an indicating bit when it writes the ID into the non-volatile memory. Thereafter, on each subsequent occurrence of the write cue event, the control circuit first determines whether the indicating bit state has been set, and if so, refrains from again writing the ID output of the ID generating circuit into the non-volatile memory.

The claims appended to this specification particularly point out and distinctly claim the subject matter of the invention. However those skilled in the art will best understand both the organization and method of operation of what the applicant considers to be the best modes of practicing the invention, together with further advantages and objects of the invention, by reading the remaining portions of the specification in view of the accompanying drawings wherein like reference characters refer to like elements.

DETAILED DESCRIPTION OF THE INVENTION

The present invention relates to a circuit incorporated into an integrated circuit (IC) for producing a binary identification code (ID) at an output terminal of the IC for identifying that particular IC. The specification describes exemplary embodiments of the invention considered best modes of practicing the invention, and detailed descriptions of those embodiments are provided below in sufficient detail to enable one of skill in the art to make and use the invention. However, those of skill in the art will understand that the invention, as recited in the appended claims, need not necessarily incorporate all of the various details included in the particular examples of the invention described below, and that other modes of practicing the invention as claimed are possible.

Figure 1:
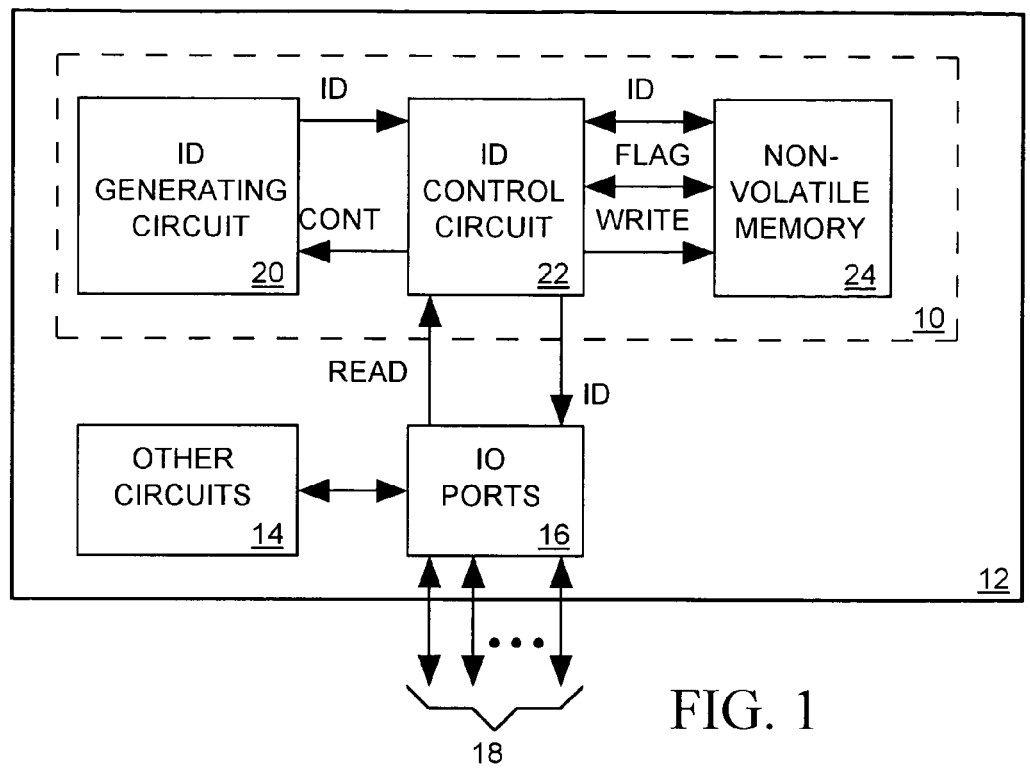
FIG. 1 depicts in block diagram form an integrated circuit (IC) including a circuit in accordance with one exemplary embodiment of the invention for providing an identification code as an IC output.

FIG. 1 illustrates an identification circuit 10 in accordance with an exemplary embodiment of the invention embedded in an IC 12 along with other circuits 14 for communicating with circuits external to IC 12 via the IC's input/output (IO) ports 16 and pins or terminals 18. Identification circuit 10 responds to a read cue event, suitably a serially-encoded READ command arriving via one of IO ports 16 from an external circuit, by providing as an IC output via one of IO ports 16, a binary identification code (ID) uniquely distinguishing IC 12 from all other ICs of the same type. Even though identification circuit 10 is of the same design in every IC in which it is embedded, if the ID has a sufficient number of bits, it is highly likely that the ID it generates when embedded in any on IC will not match the ID it generates when embedded in any other IC.

Identification circuit 10 includes an ID generating circuit 20, a control circuit 22 and a non-volatile memory 24. Control circuit 22 responds to a first occurrence of a write cue event by obtaining an ID from ID generating circuit 20 and writing it into non-volatile memory 24. Thereafter, on each occurrence of a read cue event, control circuit 22 reads the ID out of memory 24 and forwards it in serial form to an external circuit via one of IO ports 16.

Within ID generating circuit 20 there are, for each bit of the ID, a cell containing two portions of IC material designed to have similar physical characteristics, such as for example length, width, thickness, doping levels and/or dopant distribution patterns. However, due to random process variations arising during IC fabrication, those physical characteristics can vary slightly, thereby affect the impedance or other electrical characteristics of the two portions of IC. The cell incorporates the two portions of material into a circuit that produces an output signal of a state that varies with the differences in their characteristics caused by the random process variations. The state of each bit of the ID produced by ID generating circuit is a function of the state of the output signal its corresponding cell produces. ID generating circuit 20 therefore produces an ID that is essentially a random number having a value determined by random process variations during the manufacture of IC 12. When the number of bits in the ID is sufficiently large, the ID of the ID output of IC generating circuit 20 is highly likely to be unique to each individual IC containing ID generating circuit 20.

However although the ID output of generating circuit 20 is likely to be unique, it may not always have the exactly the same value if ID generating circuit 20 were to generate it more than once. For example, temperature may also affect the physical characteristics of the two portions of material in the cell corresponding a bit of the ID. When the differences in physical characteristics of the two portions of material arising out of process variations happen to be very small, then the bit could, for example, be high or low depending on which portion of material happens to be warmer when ID generating circuit 20 generates its output ID. To insure that the ID has the same value each time it provides it as an IC output, control circuit 22 therefore does not directly obtain the ID from ID generating circuit 20 each time it responds to a read cue event. Instead, control circuit 22 obtains an ID from ID generating circuit 20 only once in response to a first occurrence of a write cue event, stores it in non-volatile memory 24, and thereafter obtains the ID from memory 24 whenever it responds to a read cue event.

In the example of FIG. 1 the read cue event is an application of a particular serial READ code as input to the IC at one of I/O ports 16 which provides the READ code as input to ID control circuit 22. However, it should be understood that the ID circuit 10 could be designed to respond to other read cue events. For example, system startup (application of power to ID 12) could be used as a read cue event. Also depending on its design, ID control circuit 22 can initially obtain an ID from ID generating circuit 20 and store it in non-volatile memory 24 in response to any of several write cue events. For example, ID control circuit 22 could automatically obtain the ID from ID generating circuit 20 the first time control circuit 22 receives power or the first time it detects a read cue event. However, in either case, ID control circuit 22 must thereafter be able to determine upon detecting subsequent occurrences of the write cue event whether it has already written a valid ID into memory 24 so that it does not try to overwrite the ID in memory 24 with a new ID from ID generating circuit 26.

In the example embodiment of the invention depicted in FIG. 1, when it first writes an ID into non-volatile memory 24, control circuit 22 also writes a hard-wired flag code (FLAG) into non-volatile memory 24. Thus whenever IC 12 detects a write cue event, it first checks non-volatile memory 24 to determine whether it currently stores the FLAG code, and if so, refrains from overwriting the ID already in memory 24. A typical non-volatile memory will read out data even though it may never have been subject to a data write operation, and for some kinds of non-volatile memory, the data read out prior to a data write operation can be of unpredictable value. To make sure that such a non-volatile memory 24 is unlikely to initially read out a value that happens to match the FLAG data value before control circuit 22 writes the FLAG data into memory 24, the FLAG data suitably includes a large number of randomly-ordered 1's and 0's, preferably as large as the number of bits in the ID itself.

Figure 2:
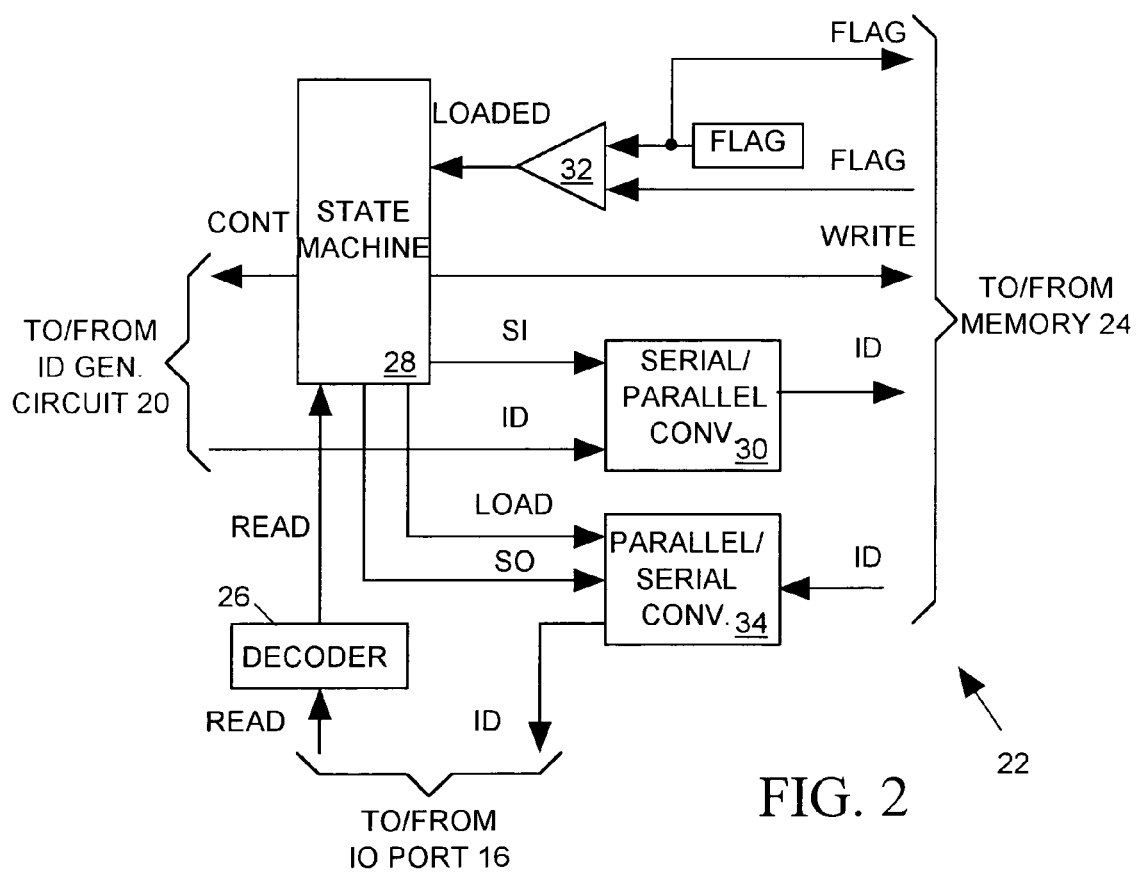
FIG. 2 depicts the ID control circuit of FIG. 2 in more detailed in block diagram form.

FIG. 2 illustrates ID control circuit 22 of FIG. 1 in more detailed block diagram form. Control circuit 22 includes a decoder 26 for supplying a single bit READ input to a state machine 28 upon receipt of the READ command via one of IO ports 16 of FIG. 1. State machine 28 supplies control signals (CONT) to ID generating circuit 20 of FIG. 1 that tell it to produce its output ID. Depending on how state machine 26 is programmed, it will signal ID generating circuit 20 to generate an ID, for example, upon power up or when the READ bit indicates a READ command has arrived at decoder 26, but only if an ID has not yet been loaded into memory 24 of FIG. 1. A LOADED bit output of a comparator 28 tells state machine 26 when an ID already resides in memory 24. When the LOADED bit is false, state machine 26 signals ID generating circuit 20 to produce an ID in serial form, and repeatedly pulses a shift-in signal (SI) to shift each bit of the ID into a serial-to-parallel converter 30. When it has shifted all bits of the ID into converter 30 and the ID appears in parallel form at the output of converter 30, it transmits a WRITE signal pulse to non-volatile memory 24 telling it to store the ID at the output of converter 30. Non-volatile memory 24 also responds to the WRITE signal pulse by storing the hard-wired FLAG code.

A comparator 32 compares the hard-wired FLAG code to the FLAG data content of memory 24 and sets the LOADED bit input to state machine 28 true when they match. Thereafter, whenever decoder 26 responds to an incoming READ command by stetting the READ bit true while the LOADED bit is true, state machine 28 refrains from writing the ID into non-volatile memory 24, But is does transmit a LOAD signal to a parallel-to-serial converter 34 telling it to load the ID stored in non-volatile memory 24 and then repeatedly pulses a shift-out signal (SO) telling parallel/serial converter 34 to serially shift each bit of the ID outward via one of IO ports 16 of FIG. 1.

Figure 3:
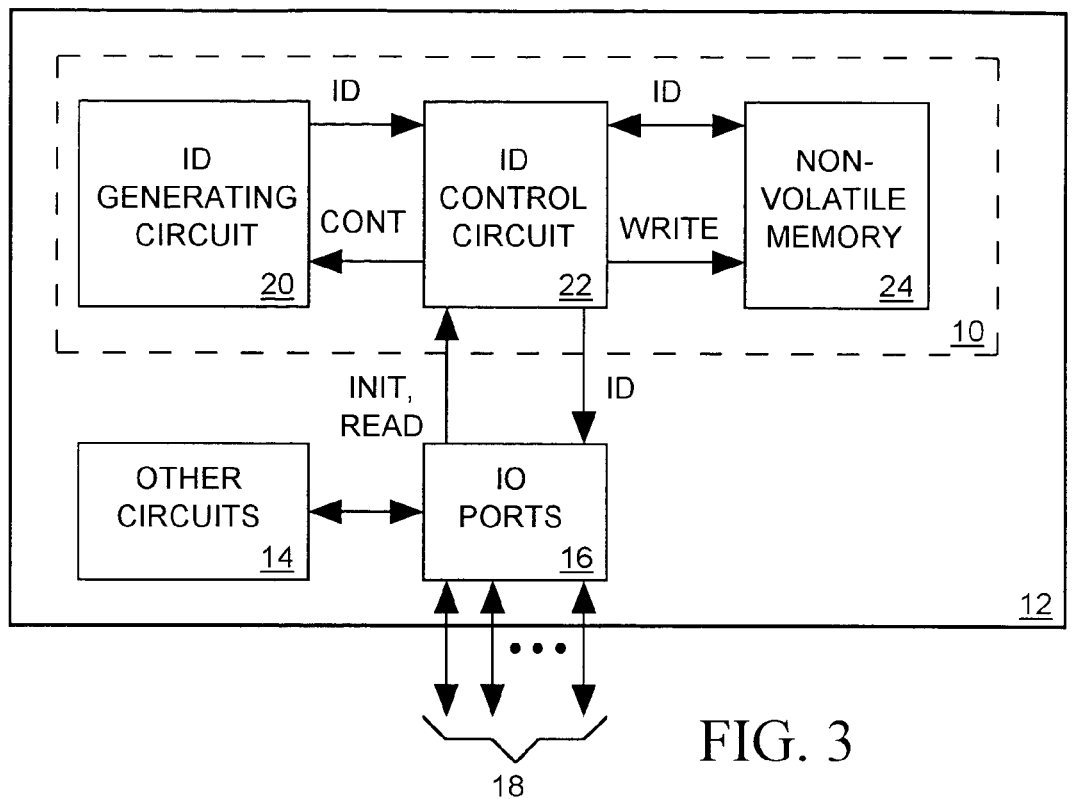
FIG. 3 depicts in block diagram form an integrated circuit (IC) including a circuit in accordance with an another exemplary embodiment of the invention for providing an identification code as an IC output.
Figure 4:
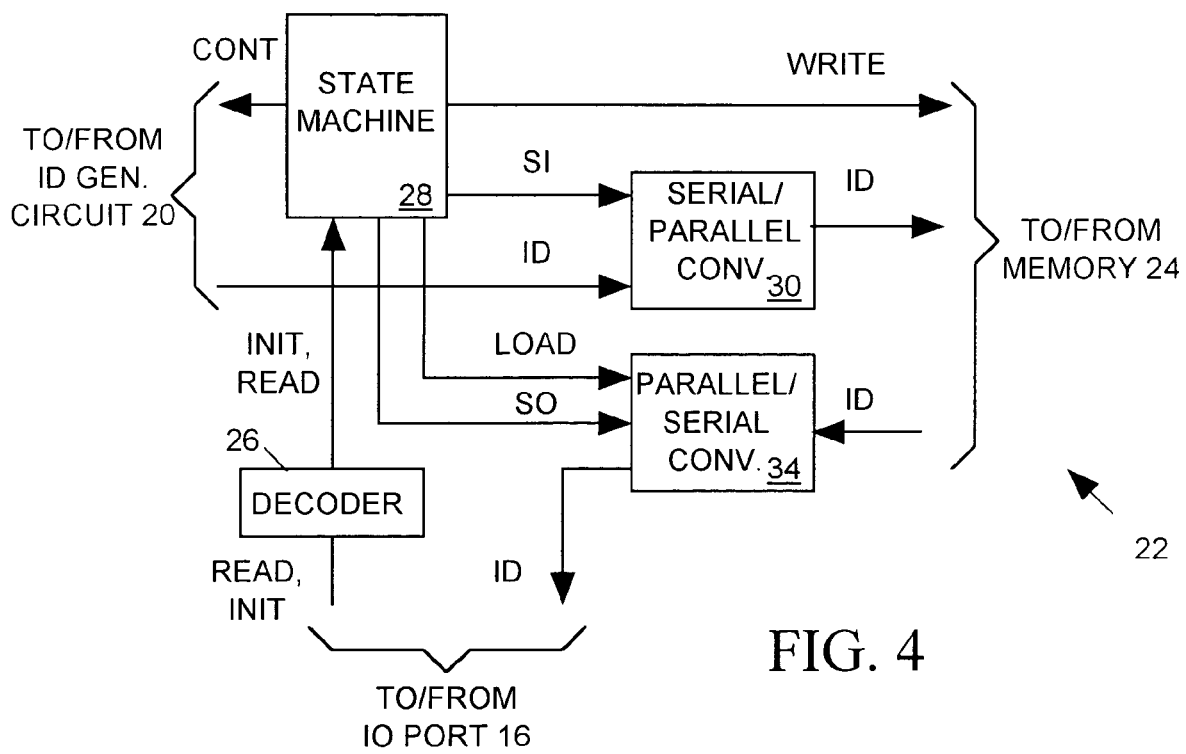
FIGS. 4 and 5 depict alternative exemplary embodiments of the ID control circuit of FIG. 3 in more detailed in block diagram form.

FIG. 3 illustrates IC 12 including an ID circuit 10 generally similar to that of FIG. 1 but wherein an initialize command (INIT) received via one of IO ports 16 acts as the write cue event telling ID control circuit 22 when to obtain an ID from ID generating circuit 20 and write it into memory 24. As illustrated in FIG. 4, decoder 26 of the ID control circuit 22 of FIG. 3 decodes both the INIT and READ commands to produce separate INIT and READ input bits to state machine 28. ID control circuit 22 of FIG. 4 need not include circuits for writing FLAG data into memory 24 because state machine 28 does not need to know whether the ID stored in memory 24 is valid when it receives the INIT signal. The INIT command is sent to IC 12 only once, for example by an integrated circuit tester when IC 12 is being tested following IC fabrication.

Figure 5:
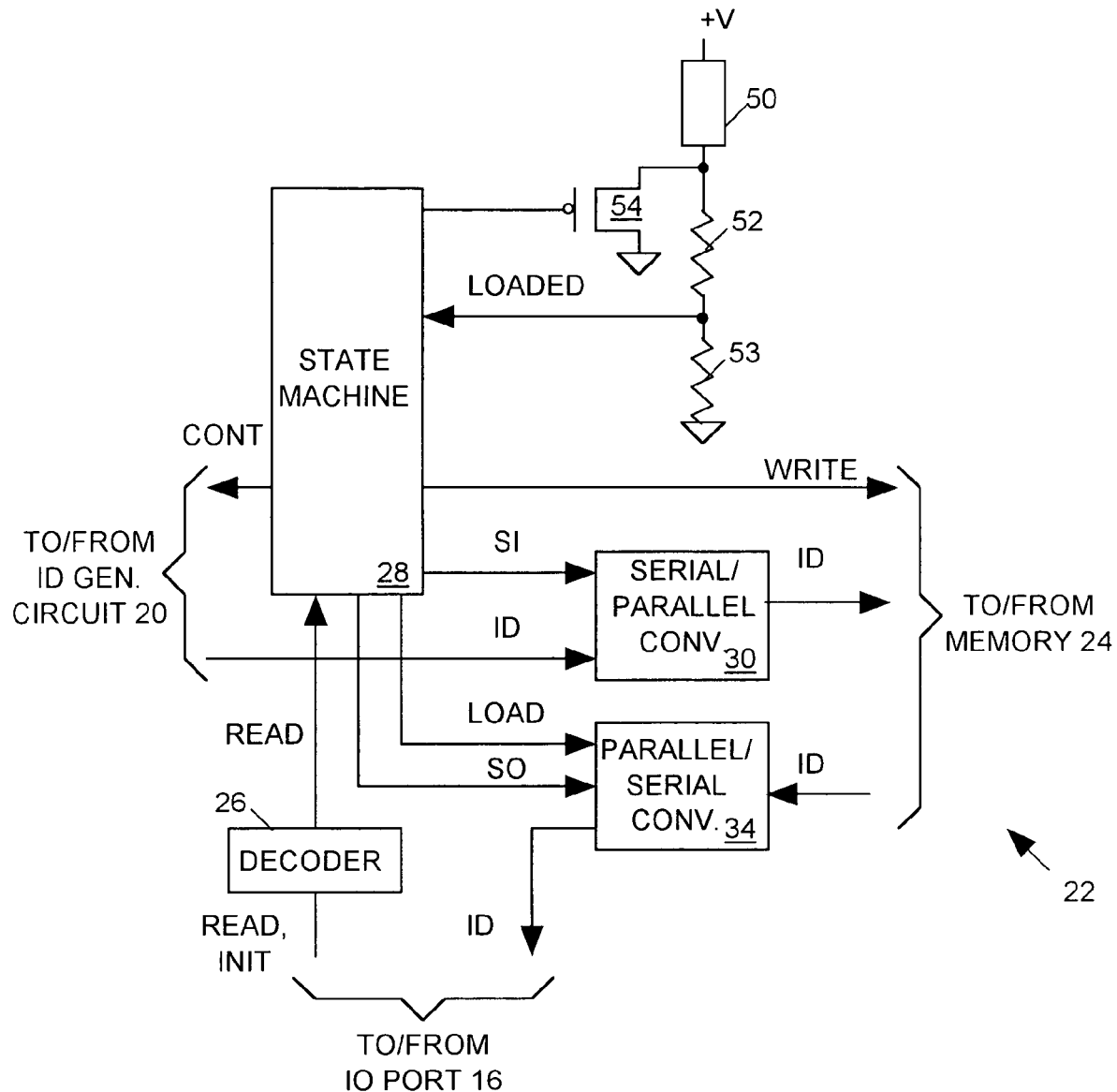

FIG. 5 illustrates an alternative embodiment of ID control circuit 22 wherein a fusible link 50 and a resistor 52 initially couple power (+V) to the LOADED input of state machine 28. Another resistor 53 couples the LOADED input to ground. Resistor 52 is smaller than resistor 53 so that initially the LOADED input will be high indicating that a valid ID does not yet reside in the non-volatile memory. After state machine 28 subsequently responds to its write cue (e.g., system power up or first READ request) to write an ID into memory 24, it briefly turns on a transistor 54 coupling fusible link 50 to ground, and transistor 54 draws enough current to blow fusible link 50. Thereafter, resistor 53 will pull the LOADED input to state machine 28 low to indicate that a valid ID resides in the non-volatile memory and to tell state machine 28 to ignore any subsequently received cue to write an ID to the non-volatile memory.

Figure 6:
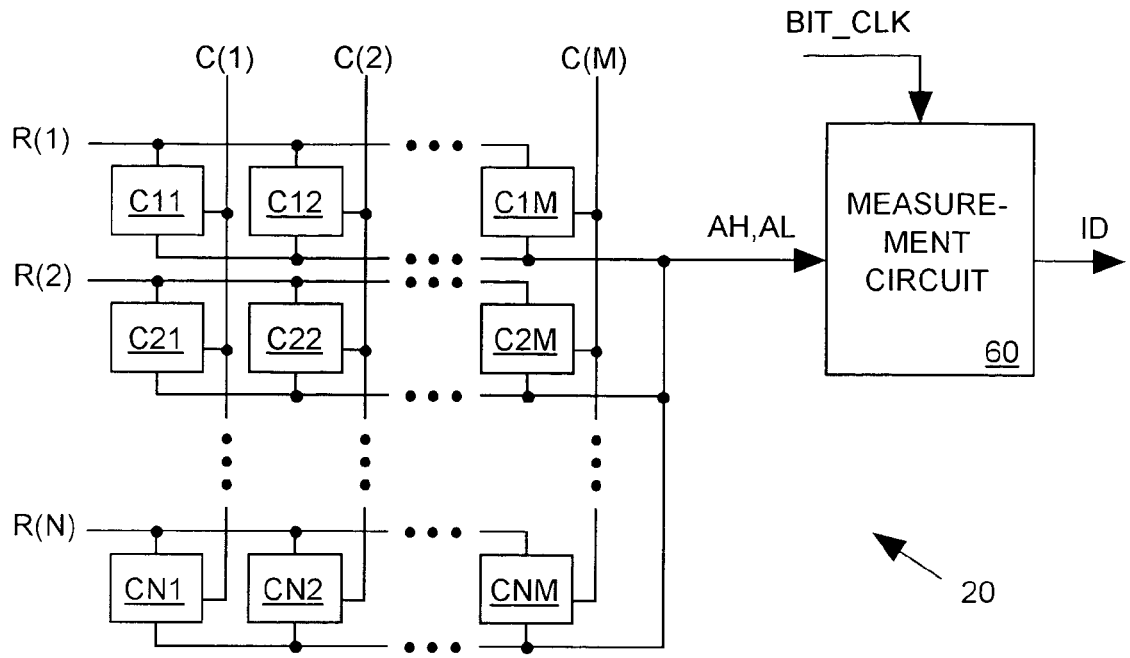
FIG. 6 depicts the ID generating circuit of FIGS. 1 and 3 in more detailed block diagram form.

FIG. 6 illustrates an example embodiment of ID generating circuit 20 of FIG. 1 for producing an N×M bit ID where N and M may be any integers greater than 0. ID generating circuit 20 includes an N×M array of ID cells C11–CNM and a measurement circuit 60 controlled by the control data (CONT) produced by state machine 28 of any of FIGS. 1–5 including a set of row and column select bits R(1)–R(N) and C(1)–C(M) and a BIT_CLK signal. Each ID cell Cij receives a row select bit R(i) and a column select bit C(j) as input, and when both its row and column select bits are high, ID cell Cij drives a differential signal AH, AL to a state that is a function of random process variation in material within the cell that occurred during the fabrication of that particular ID cell. When state machine 28 responds to the first write cue event, it drives the row and column select bit inputs of each of ID cells C11–CNM high in turn so that each ID cell in turn drives the AH,AL signal. Measurement circuit 60, clocked by the BIT_CLK signal from state machine 20, generates each successive bit of the ID to a state determined by the state of the output of each successive ID cell C11–CNM.

Figure 7:
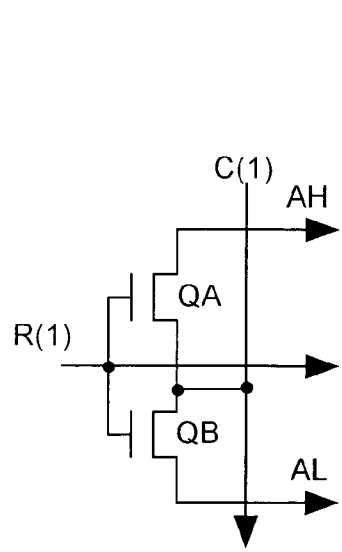
FIGS. 7 and 8 depict alternative embodiments of one of the ID cells of the ID generating circuit of FIG. 6 in schematic diagram form.

FIG. 7 illustrates a suitable implementation of ID cell C11 of FIG. 6. Other ID cells may be similar. ID cell C11 includes a pair of transistors QA and QB designed to be identical but which will have slightly different characteristics due to random variations in parameters such as channel lengths, channel widths, doping levels and the like occurring during IC fabrication. Row select bit R(1) drives the gate of transistors QA and QB. Transistor QA couples column select bit C(1) to AH and transistor QB couples C(1) to AL. When R(1) and C(1) are high, AH will be higher or lower than AL depending on whether the source-drain path of QA happens to be more or less conductive than that of transistor QB. When ID cell C11 is controlling the AH, AL signal, measurement circuit 60 produces an output bit of the ID that is a 1 or a 0 determines whether AH is higher than AL. U.S. Pat. No. 6,161,213, issued Dec. 12, 2000 to Lofstrom and incorporated herein by reference, describes a measurement circuit suitable for use as measurement circuit 60.

Figure 8:
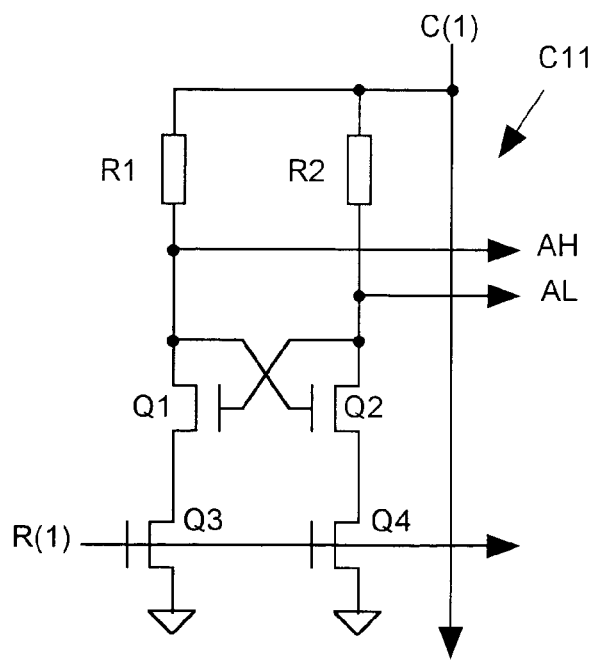

FIG. 8 illustrates an alternative implementation of ID cell C11 of FIG. 6 including a pair of resistors R1 and R2, such as for example polysilicon resistors, designed to be identical but which will have slightly different resistances due to random process variations arising during their fabrication. Resistor R1 and channels of a pair of transistors Q1 and Q3 couple column select bit C1(1) to ground. Resistor R2 and a channels of a pair of transistors Q2 and Q4 also couple C(1) to ground. Row select bit R(1) drives the gates of transistors Q3 and Q4. The drain (AL) of transistor Q2 drives the gate of transistor Q1 while the drain (AH) of transistor Q1 drives the gate of transistor Q2. When R1 is of slightly lower resistance than R2, then when state machine 28 drives R(1) and C(1) high, transistor Q2 will turn on, transistor Q1 will turn off, AH will go high and AL will go low. Otherwise, when R1 is of slightly lower resistance than R1, then when state machine 28 drives R(1) and C(1) high, transistor Q1 will turn on, transistor Q1 will turn off, AL will go high and AH will go low. Measurement circuit 60 then responds to each BIT_CLK pulse by producing a bit of the ID of state depending on whether AH is higher or lower than AL.

The foregoing specification and the drawings depict exemplary embodiments of the best mode(s) of practicing the invention, and elements or steps of the depicted best mode(s) exemplify the elements or steps of the invention as recited in the appended claims. However the appended claims are intended to apply to any mode of practicing the invention comprising the combination of elements or steps as described in any one of the claims, including elements or steps that are functional equivalents of the example elements or steps of the exemplary embodiment(s) of the invention depicted in the specification and drawings.

The invention claimed is:

1. An integrated circuit (IC) comprising:
    an ID generating circuit for generating a binary identification code (ID) having a plurality of bits, wherein a state of each bit of the plurality of bits is determined by random process variation in material forming the IC;
    a non-volatile memory; and
    a control circuit for responding to a write cue event by writing the ID generated by the ID generating circuit into the non-volatile memory.

2. The IC in accordance with claim 1 wherein the control circuit also reads the ID out of the non-volatile memory and provides the ID as an output of the IC.

3. The IC in accordance with claim 2 wherein the control circuit reads the ID out of the non-volatile memory and provides the ID as an output of the IC in response to a read cue event.

4. The IC in accordance with claim 3 wherein each read cue event comprises an application of a read code as input to the IC.

5. The IC in accordance with claim 4 wherein each write cue event comprises application of a read code as input to the IC.

6. The IC in accordance with claim 5 wherein each write cue event comprises application of a write code as input to the IC.

7. The IC in accordance with claim 1 wherein the ID generating circuit comprises:
    a plurality of identification cells, wherein each identification cell produces an output of state determined by random process variation in material forming the identification cell, and
    a circuit for generating the ID as a function of outputs of the plurality of identification cells.

8. The IC in accordance with claim 7 wherein each identification cell comprises at least one transistor, and wherein the value of the output of that identification cell is a function of a random process variation in material forming the at least one transistor.

9. The IC in accordance with claim 8 wherein each identification cell comprises two transistors, and wherein the value of the output of that identification cell is a function of a difference random process variations in material forming the transistors.

10. The IC in accordance with claim 7 wherein each identification cell comprises at least one resistor, and wherein the value of the output of that identification cell is a function random process variation in material forming the at least one resistor.

11. The IC in accordance with claim 10 wherein each identification cell comprises two resistors, and wherein the value of the output of that identification cell is a function of a difference in random process variations in material forming the resistors.

12. The IC in accordance with claim 1 wherein the control circuit writes the ID generated by the ID generating circuit into the non-volatile memory once in response to a first occurrence of the write cue event and then refrains from writing the ID generated by the ID generating circuit into the non-volatile memory in response to subsequent occurrences of the write cue event.

13. The IEC in accordance with claim 1 wherein the control circuit writes a flag code into the non-volatile memory when it writes the ID generated by the ID generating circuit into the non-volatile memory in response to the write cue event.

14. The IC in accordance with claim 13 wherein the control circuit writes the ID generated by the ID generating circuit and a flag code into the non-volatile memory in response to a first occurrence of the write cue event, and responds to each subsequent occurrence of the write cue event by determining whether the non-volatile memory stores the flag code.

15. The IC in accordance with claim 14 wherein the write cue event comprises application of power to the control circuit.

16. The IC in accordance with claim 14 wherein the write cue event comprises application of a code as input to the IC.

17. The IC in accordance with claim 1 wherein the write cue event is application of power to the control circuit.

18. The IC in accordance with claim 1 wherein the write cue event is application of a code as input to the IC.

19. The IC in accordance with claim 1 further comprising:

an indicating circuit for generating an indicating signal indicating whether the ID resides in the non-volatile memory, wherein when the indicating signal indicates that the ID does not reside in the non-volatile memory upon an occurrence of the write cue event, the control circuit responds to that occurrence of the write cue event by writing the ID to the non-volatile memory and then transmitting a control signal the indicating circuit to set the indicating signal to indicate that the ID resides in the non-volatile memory, and wherein when the indicating signal indicates that the ID resides in the non-volatile memory upon an occurrence of the write cue event, the control circuit responds to that occurrence of the write cue event by refraining from writing the ID to the non-volatile memory.

20. The IC in accordance with claim 19 wherein the indicating circuit includes a fuse and responds to the control signal from the control circuit by blowing the fuse, thereby altering a state of the indicating signal.

* * * * *